United States Patent [19]

Curran

[11] 3,998,050
[45] Dec. 21, 1976

[54] REVERSE FLOW AFT INLET RAMJET SYSTEM

[75] Inventor: Edward T. Curran, Dayton, Ohio

[73] Assignee: The United States of America as represented by the Secretary of the Air Force, Washington, D.C.

[22] Filed: Mar. 11, 1975

[21] Appl. No.: 557,570

Related U.S. Application Data

[62] Division of Ser. No. 431,180, Jan. 7, 1974, abandoned.

[52] U.S. Cl. .................................. 60/245; 60/270 R
[51] Int. Cl.² ....................... F02K 9/02; F02K 7/10
[58] Field of Search ................ 60/245, 270 R, 251, 60/244, 39.23; 244/53 B

[56] References Cited

UNITED STATES PATENTS

| | | | |
|---|---|---|---|
| 2,417,445 | 3/1947 | Pinkel | 60/39.65 |
| 2,799,987 | 7/1957 | Chandler | 60/245 |
| 2,977,753 | 4/1961 | Boulet | 60/270 R |
| 3,038,408 | 6/1962 | Kluge | 60/244 X |
| 3,112,903 | 12/1963 | Conrad | 60/244 X |
| 3,482,403 | 12/1969 | Polk, Jr. | 60/270 R |
| 3,802,192 | 4/1974 | Curran | 60/245 |

*Primary Examiner*—William L. Freeh
*Assistant Examiner*—Thomas I. Ross
*Attorney, Agent, or Firm*—Joseph E. Rusz; Arthur R. Parker

[57] ABSTRACT

A combined rocket/ramjet for propelling a missile including a missile payload module and an integral rocket/ramjet engine system strapped on the missile payload module, and incorporating a liquid fuel rocket engine and a ramjet engine having a combustion chamber common with the rocket engine, an exhaust nozzle, and multiple aft-mounted air inlets movable between a retracted position during rocket boost flight and an extended, pop-out position to receive and direct ram air in a reverse flow direction into the combustion chamber during ramjet flight.

2 Claims, 1 Drawing Figure

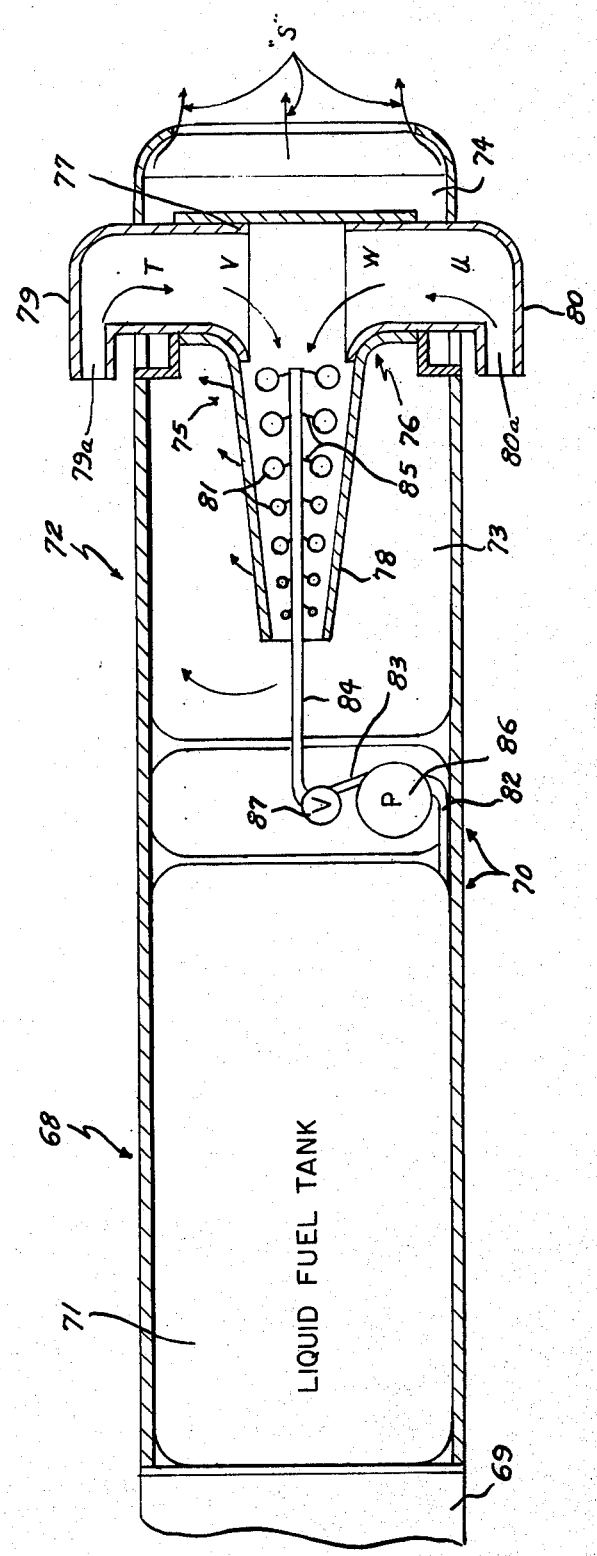

REVERSE FLOW AFT INLET RAMJET SYSTEM

RIGHTS OF THE GOVERNMENT

The invention described herein may be manufactured and used by or for the Government of the United States for all governmental purposes without the payment of any royalty.

REFERENCE TO RELATED APPLICATIONS

This is a division of application Ser. No. 431,180, filed Jan. 7, 1974, now abandoned.

BACKGROUND OF THE DISCLOSURE

This invention relates generally to integral rocket/ramjets and, in particular, to ramjets having multiple, aft-mounted air inlets and used to propel missiles.

One problem involved with the aforementioned ramjets is that the aft-mounted air inlets thereof permanently protrude outside the missile body envelope and thus make internal bomb bay stowage very difficult. On the other hand, the new and improved ramjet system of the present invention eliminates the foregoing problem principally by making the aft-mounted air inlets thereof retractable into a completely recessed position when not in use by novel and yet simplified means to be hereinafter further disclosed in the following summary and detailed description thereof.

SUMMARY OF THE INVENTION

The present invention consists principally in a novel air-launched ramjet-powered missile, or a combined rocket and ramjet propulsion unit that may be uniquely strapped on, or to a missile payload module and which may include a liquid fuel-component or rocket engine and a ramjet engine integrated therewith and incorporating a combustion chamber immediately downstream of, and receiving the discharge from the liquid or solid fuel component or rocket engine. In unique combination with and forming an integral part of the ramjet engine are a plurality of aftmounted, air inlets housed within the exhaust nozzle structure of the combined unit and adjustable between a first, retracted and recessed position completely out of the air stream and disposed within the engine casing during the boost/launch operation to be effected either by means of the air launch thereof, or by operation of the rocket engine, and a second, extended or pop-out position to receive ram air thereinto during the cruising operation of the ramjet engine.

A common air injector tube, in communication with each of the aforementioned air inlets, uniquely and yet in a relatively simplified manner directs the incoming ram air in a reverse flow direction to thereby promote the more efficient mixing, reaction and combustion of fuel therewith in the said common combustion chamber.

Other objects and inherent advantages of the invention will readily appear hereinafter in connection with the following disclosure, taken with the single view of the drawing which represents a longitudinal or axial view, partly broken-away, schematic and sectioned, illustrating details of the unique reverse-flow aft-mounted, multiple inlets and air injector tube as applied to the new and improved integral rocket/ramjet engine of the present invention.

Referring to the single view of the drawing, the new and improved ramjet-missile propulsion system of the present invention is indicated generally at the reference numeral 68 as including a missile payload module 69 that may be releasably attached on the forward end of a combined rocket/ramjet-propulsion unit indicated generally at 70. The latter may comprise a rocket engine-portion-liquid fuel containing-tank 71, a ramjet engine-portion 72, and a single combustion chamber 73 that is common to both the rocket engine-portion 71 and ramjet engine-portion 72. The exhaust nozzle section is denoted generally at 74 and the exhaust flow therefrom at the arrows S. Contained within the ramjet engine-portion 72 is a unique form of a combined aft mounted-retractable air inlet and air injector tube-incorporating means comprising and incorporating the basic concept of the present invention and which is indicated generally at 75.

The above-mentioned combined retractable air inlet and injector tube-incorporating means 75 may preferably comprise an integral housing member or structure, indicated generally at 76 and which may incorporate a first, ram air-inlet-supporting housing portion at 77 and a second, air injector tube-containing-housing portion 78 that is integrally formed to and with the first-named housing portion 77 and which extends into the common combustion chamber 73. The first, ram air-inlet-supporting housing portion 77, which may preferably be comprised of and formed from supporting wall surfaces interiorily disposed in and integrated with the casing of the combined unit 70, incorporates a plurality of the inventive retractable air inlet elements, as at 79 and 80, which, are extendable from an inner, recessed and compact position and an outer, pop-out position, as is illustrated in the aforementioned single view of the drawing.

When the air inlet elements 79, 80 are in their pop-out position, the incoming ram air naturally initially enters the air entrance openings at 79a and 80a, as is further denoted by the arrows T and U, where it is turned inwardly and then in a forward or reverse flow directon, as is respectively illustrated at the arrows V and W. At this point, the incoming ram air is introduced into the housing portion 78 containing the said air injector tube and which has been previously described as being integrally formed with the housing structure 77 of the air inlet elements 79 and 80. The air injector tube-passage is in a naturally open and continuous communication with the air inlet element-passages 79, 80. The aforementioned air injector tube contained within the housing 78 has been specifically adapted to accommodate the injection of liquid fuel into the combustion chamber 73, as will be further described hereinafter.

The adaptation referred to above for the air injector tube-containing housing 78 includes the formation therein of a plurality of air passage-openings as indicated generally at 81, that are disposed along the outer circumference thereof and which communicate with the common ram-air-receiving passage naturally formed in and along the longitudinal axis of the tube 78. It is this longitudinal passage that would be, and is in open communication between the air passages of the inlet elements 79, 80, at the aft end thereof, and the combustion chamber 73 at the forward end thereof. In this manner, of course, the incoming ram air is introduced into the combustion chamber 73 both through the forward end of the tube 78 and, by means of the communicating openings 81, throughout the said chamber.

In its most basic form, the combined unit 68 could be air launched from a supersonic aircraft to thereby achieve the necessary or desired speed for ramjet operation. Thereafter, the ramjet engine 72 could be placed into immediate operation to propel it and the missile payload module 69 attached therewith at the specified cruising operation by extending the retractable air inlet elements, as at 79 and 80 to their outer, pop-out position for the capture of ram air thereby and its introduction in the inventive reverse flow direction by and through means of the air injector tube-containing housing 78 and its plurality of air passages, as at 81, into the combustion chamber 73 where it would be mixed, ignited and thus produce hot gas products with liquid fuel being fed from the liquid fuel-containing tank 71.

The above-referred to liquid fuel would have been fed or injected into the incoming ram air within each of the plurality of air passage openings 81 by way of the fuel injection manifold 84 and the fuel injectors, as at 85, extending between the manifold 84 and each of the air openings 81. Of course, to feed this liquid fuel from the tank 71 to the manifold 84, fuel feed lines 82 and 83 and a fuel pump and control valve, as at 86 and 87, may be utilized. In this connection, in place of the initial air launching step, a built-in source of oxygen, for example, may be carried for introducing oxygen into the combustion chamber 73 for its mixture with the liquid fuel from the tank 71 to thereby produce the initial rocket/boost/launching operation required to bring the ramjet engine 72 up to the desired speed range, after which ramjet flight would be initiated for cruising operations, as noted before.

Thus, a new and improved strap-on ramjet system for propelling missiles or aircraft has been developed by the present invention in which aft-mounted, pop-out ram air-inlets have been utilized together with a reverse flow combustion process that promotes greater combustion efficiency in a much cleaner and more compack package facilitating the internal bomb bay stowage thereof.

I claim:

1. A jet propulsion apparatus for powering a missile or aircraft at supersonic or hypersonic flight speeds comprising: a main enclosure having an exhaust nozzle at the downstream end thereof; a rocket propulsion unit incorporating a rocket fuel supply container and positioned at the upstream end of said main enclosure; at least one combustion chamber in communication with, and located in said main enclosure downstream of said rocket fuel supply container; a ramjet propulsion unit incorporating said combustion chamber and including ram air-passage means disposed in recessed relation within the walls of said main enclosure upstream of said exhaust nozzle and at the downstream end of said combustion chamber; adjustably positioned ram air-controlling means built into said ram air-passage means and incorporating first, upstream-facing ram air-inlet means movable between a retracted position in a recessed, compact relation in said main enclosure and an extended position admitting ram air into the said ram air-passage means for initiating and maintaining a predetermined cruising operation for said ramjet propulsion unit for providing ramjet flight; and a reverse flow-directing means formed in direct open communication between said ram air-passage means and said combustion chamber; said reverse flow-directing means having second ram air inlet means forming a natural extension of and being slidably engaged and in open communication with an interior portion of said first ram air inlet means and containing a main air egress opening in an upstream location and a plurality of peripheral auxiliary air egress openings all communicating with said combustion chamber; said fuel supply container incorporating a liquid fuel, and said main enclosure further having an intermediate, completely wall-enclosed compartment between said liquid fuel container and said combustion chamber automatically blocking the reverse ram air egressing from said main egress opening and simultaneously returning the said air flow in a downstream direction, said compartment housing a fuel pump; valve control means; and first and second fuel feed lines respectively interconnected with the liquid fuel container for selectively feeding a supply of liquid fuel in a downstream direction into a fuel injection manifold having a first manifold line section in fluid communication with said valve control means and a second manifold line section integrally formed with said first line section and extending into said combustion chamber and the interior of said reverse flow-directing means in open communicaton with the said auxiliary egress openings thereof; said ram air-controlling means comprising a plurality of retractable air inlet scoop elements each adjustably positioned in the ram air-inlet passages corresponding thereto for movement between retracted, recessed and inoperable, and extended, pop-out and operable positions thereby alternately closing off and admitting ram air into said combustion chamber through said reverse flow-directing means.

2. A jet propulsion apparatus for powering a missile or aircraft at supersonic or hypersonic flight speeds as in claim 1, wherein said reverse flow-directing means comprises an air injector tube incorporating a main air passage terminating in said main egress opening at the upstream end thereof, and enclosing and in open communication with said second section of said fuel injection manifold for thereby providing for the initial substantial injection of liquid fuel into the incoming ram air in preparation for the subsequent combined injection of a fuel-air mixture into the said combustion chamber; said air injector tube further incorporating a plurality of circumferential air openings comprising the said auxiliary egress openings communicating between said tube and said main air passage; and said second section of said fuel injection manifold having a separate fuel injector for, and communicating with each of said circumferential air openings for simultaneously injecting liquid fuel in a plurality of spaced-apart sites in the incoming ram air being admitted into said combustion chamber through said air injector tube.

* * * * *